United States Patent
Wang et al.

(10) Patent No.: US 9,224,211 B2
(45) Date of Patent: *Dec. 29, 2015

(54) METHOD AND SYSTEM FOR MOTION DETECTION IN AN IMAGE

(71) Applicant: Google Inc., Mountain View, CA (US)

(72) Inventors: Meng Wang, Mountain View, CA (US); Yushi Jing, Mountain View, CA (US)

(73) Assignee: Google Inc., Mountain View, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/140,440

(22) Filed: Dec. 24, 2013

(65) Prior Publication Data

US 2014/0105463 A1   Apr. 17, 2014

Related U.S. Application Data

(63) Continuation of application No. 13/149,303, filed on May 31, 2011, now Pat. No. 8,630,454.

(51) Int. Cl.
*G06K 9/00* (2006.01)
*G06T 7/20* (2006.01)

(52) U.S. Cl.
CPC ............. *G06T 7/2006* (2013.01); *G06T 7/2066* (2013.01); *G06T 2207/10016* (2013.01)

(58) Field of Classification Search
USPC ........................................................ 382/103
See application file for complete search history.

(56) References Cited

U.S. PATENT DOCUMENTS

| | | | |
|---|---|---|---|
| 6,570,624 B2 | 5/2003 | Cornog et al. | |
| 2004/0057600 A1* | 3/2004 | Niwa | 382/103 |
| 2004/0091170 A1 | 5/2004 | Cornog et al. | |
| 2006/0034545 A1 | 2/2006 | Mattes et al. | |
| 2007/0086621 A1 | 4/2007 | Aggarwal et al. | |
| 2007/0154066 A1 | 7/2007 | Lin et al. | |
| 2007/0258009 A1 | 11/2007 | Kanda et al. | |
| 2011/0043639 A1* | 2/2011 | Yokohata | 348/169 |

OTHER PUBLICATIONS

Liu et al., "SIFT Flow: Dense Correspondence Across Different Scenes," Proc. ECCV '08 10th European Conf. on Computer Vision: Part III, 2008, 14 pages.
Motion Field, http://en.wikipedia.org/w/index.php?title=Motion -field&printable=yes, downloaded Oct. 27, 2010, 3 pages.
Non-Final Rejection dated May 23, 2013 for U.S. Appl. No. 13/149,303.
Notice of Allowance dated Sep. 4, 2013 for U.S. Appl. No. 13/149,303.

* cited by examiner

*Primary Examiner* — Alex Liew
(74) *Attorney, Agent, or Firm* — IP Spring

(57) ABSTRACT

Embodiments for moving object detection in an image are disclosed. These include detecting a moving object in an input image by selecting video frames that are visually similar to the input image, generating a model motion image by estimating motion for each selected video frame, and detecting, using the model motion image, a moving object in the input image based on differences between the model motion image and the input image.

20 Claims, 5 Drawing Sheets

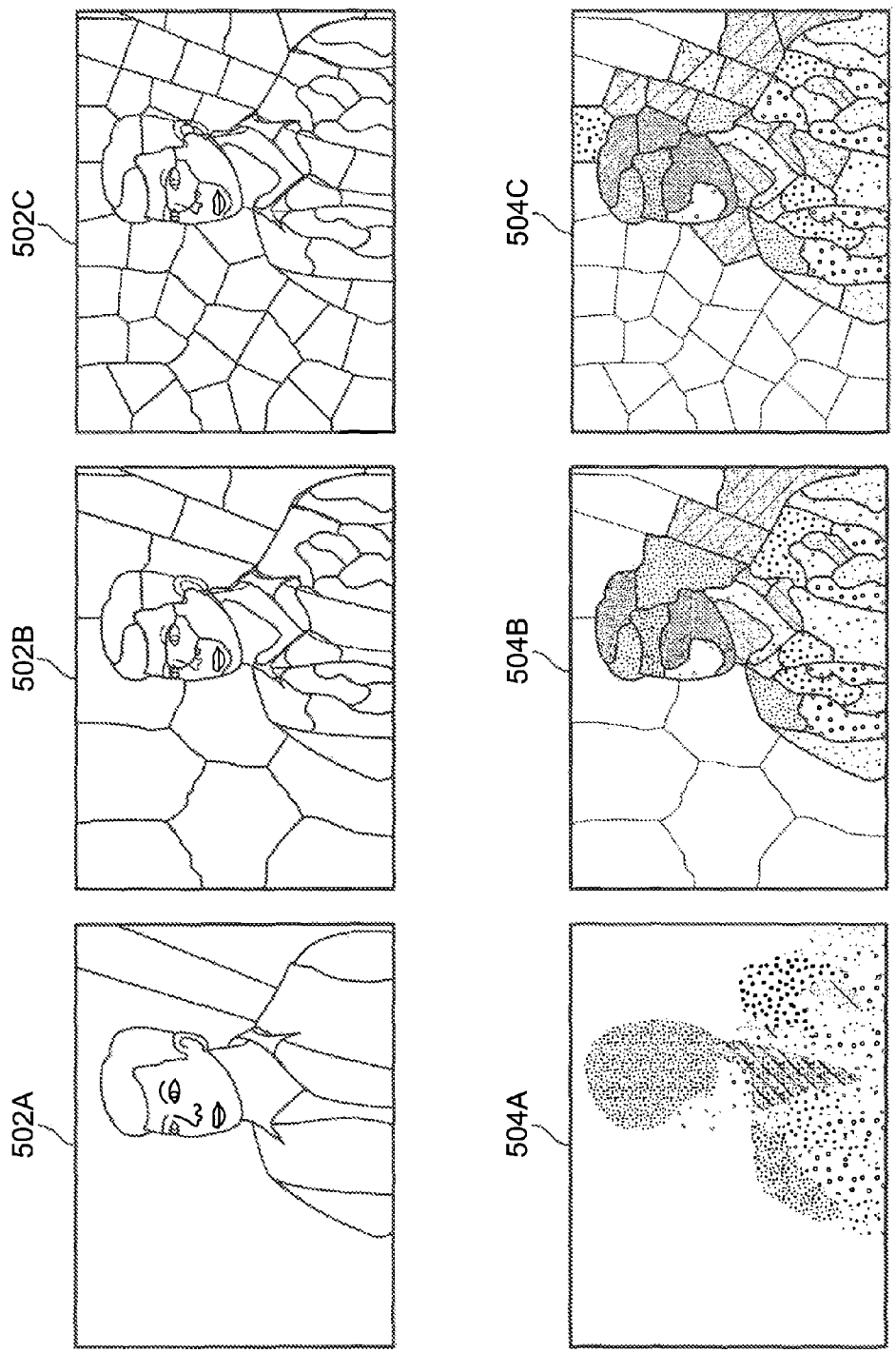

METHOD AND SYSTEM FOR MOTION DETECTION IN AN IMAGE

CROSS REFERENCE TO RELATED APPLICATIONS

The present application is a continuation of U.S. patent application Ser. No. 13/149,303, filed on May 31, 2011, which is hereby incorporated by reference in its entirety.

BACKGROUND

1. Field

This disclosure relates generally to motion detection on an image.

2. Background

Many techniques are known to detect motion within a frame or an image when the frame is part of a series of frames, as in a movie or video clip. First, a single frame is selected from the series of consecutive, related frames from a continuous reel (e.g., a movie, or video clip), where each frame represents an image from one of a consecutive sequence of time intervals. Second, the selected frame is compared to a frame that precedes it and/or a frame that follows it in the series. Finally, based on the comparisons of the selected frame to the preceding and/or subsequent frames, it is determined which portion or portions of the selected frame have changed. The changed portions are regarded as moving objects.

However, difficulties arise in situations when the selected frame or image stands alone, is not part of a series of frames, is part of a series of time-lapsed images, or otherwise is selected from a series of frames but is not compared against any of the frames of the series that immediately precedes and/or are subsequent to the selected frame. In such cases, the above technique cannot be applied when trying to determine which portions of a selected image or frame are moving, were moving or are likely to move at the time of image capture, because there are no preceding or subsequent frames that may be referenced to make such a determination.

Comparing a selected frame to other frames from the series, as described above, and other conventional techniques for moving object detection include differentiating foreground objects from background objects based on a user's input. For example, in a given frame, a user would select objects in the frame to indicate which objects of the frame are the foreground objects and which objects of the frame are background objects. Then based on the selected foreground objects, as determined by the user's input, conventional motion detection techniques are then applied to analyze foreground objects for motion as discussed above.

SUMMARY OF EMBODIMENTS

Methods, systems, and articles of manufacture for detecting moving objects in static images are disclosed. These include detecting a moving object in an input image by selecting video frames that are visually similar to the input image, generating a model motion image by estimating motion for each selected video frame, and detecting, using the model motion image, a moving object in the input image based on differences between the model motion image and the input image.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

FIG. 5 illustrates a line drawing representation of an exemplary segmentation of an input image.

DETAILED DESCRIPTION

While illustrative embodiments for particular applications are described in the present disclosure, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

Figure 1:
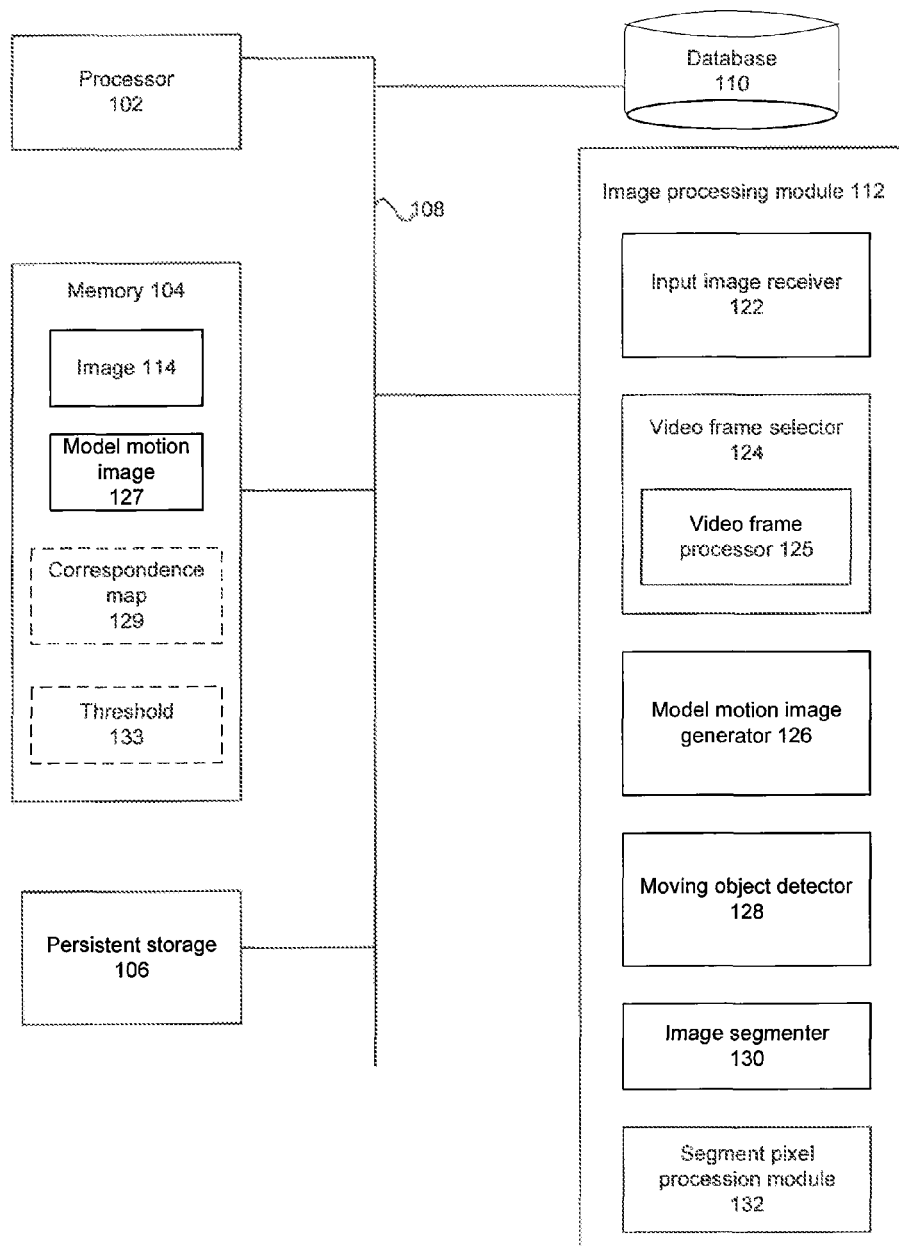
FIG. 1 illustrates a system for detecting moving objects in static images.

The present disclosure is generally directed to detecting moving objects in images. Moving objects are also referred to as foreground or foreground objects. The term 'moving object' as used herein, includes objects in the image that are in motion and/or are anticipated or determined to be in motion at the time of image capture. FIG. 1 illustrates a system 100 for detecting moving objects in an image. An input image may be selected by, input into or otherwise queried with system 100. The image may include a static or still image, such as a photograph, a frame from a video capture, digital rendering, or the like.

System 100 may then analyze the input image and compare it against any number of video frames. The video frames may or may not have any direct relation to the input image. For example, the image may be input from person X's camera. The video frames may then include a sampling of videos found online that may or may not have originated with person X. Then for example, system 100 may browse through videos posted online to find video frames that have some level of visual similarity to the input image. In other example embodiments, system 100 may have previously analyzed such available videos and catalogued them based on their visual contents.

After identifying one or more video frames that are visually similar to the input image, system 100 may then analyze each selected frame to determine movement information (also referred to as "motion information") associated with that frame. The movement information may include, for example, information pertaining to any of the objects in the frame that may have been in motion when the frame was captured, and including, but not limited to the direction of the motion. Based upon the movement information of any number of the video frames, system 100 may generate a model motion image that corresponds to the input image. System 100 may optionally warp the selected video frames to align objects of the selected video frames with visually similar objects in the input image, and apply the same or similar warp function to the motion information of the respective selected video frames. System 100 may then compare the model motion image, with or without warping, to the input image to determine which object(s) of the input image were likely to be moving at the time of image capture.

It may be advantageous to be able to determine the moving object(s), the object(s) of an input image that are likely to be motion, and/or the object(s) of an image likely to have been in motion (from hereon, collectively referred to simply as moving object(s)) for many reasons. Detection of moving object(s) from an image may allow a device to allot a greater amount of memory and/or processing resources to the moving object(s) so as to capture and/or store the image with higher precision and/or higher quality than for non-moving or background portions of the image. For example, in image compression, a greater portion of the compressed image allotment may be reserved for the moving object(s) of the image so as to store the moving objects in a manner to facilitate lossless recovery of those portions (or at least reduce or minimize the loss when compared to conventional compression techniques).

System 100 may be used to capture an image from a camera or other image capture device. In which case, based on its analysis of the objects to be captured, the system 100 may determine in which area(s) and/or upon which object(s) the device should focus greater attention for they are likely to be the moving object(s) when the image is captured. In such an example, a device may be focused on an image, and prior to the image capture, system 100 may analyze the image upon which the device is focused and perform a moving object analysis to determine which object(s) of the image are likely to be moving upon image capture. For example, if there is an image of a dog chasing a cat, then system 100 may determine that the device should apply greater resources to the dog and cat than the rest of the scene, as they are the moving objects.

One example implementation may be in any time lapsed image capture, where a single frame is captured and after the passing of a period of time, another image is captured representing a visually similar scene. Being able to focus the image capture device's resources on those moving object(s) (e.g., those objects likely to be moving upon image capture) may improve the quality of the captured image, whether the image capture is from the same or different locations. System 100 can be capable of predicting or anticipating the motion of one of more objects in a still image.

Another example implementation may be in security cameras that take images of particular locations on a time delayed interval or upon motion detection, wherein prior to performing an image capture, the scene to be captured may be analyzed by system 100 to determine on which object(s) the camera should focus more attention and/or greater resources. For example, a security camera that captures an image of a person using system 100 may focus more detailed attention on the person who is likely to be moving in the image than on the background or other still objects that may be less likely to be in motion.

Other uses of system 100 may include, but are not limited to, image retargeting, object recognition, image segmentation and image summarization. Further through its analysis of online videos or other videos that may not be directly associated with the input image, system 100 may be used to analyze a broader spectrum of still images, in addition to those for which there are related preceding and/or subsequent reference frames or images.

System 100 of FIG. 1 includes a processor 102 which may include any computer or electronic processor for executing and/or processing information, including visual, pixel and/or motion information. Processor 102 may include or be part of any device capable of processing any sequence of instructions. Processor 102 may include, for example, a computer processor, a processor in a mobile device or other electronic and/or digital processor. Processor 102 may, for example, be included in a computer, a mobile computing device, a set-top box, an entertainment platform, a server, a camera or other image capture device, a server farm, a cloud computer and the like.

Processor 102 may be connected to a memory 104 via a bus 108. A memory 104 may include volatile memory, persistent, virtual or otherwise, to store information for use by or output by the system 100. Memory 104 may include, for example, random access memory (RAM) and/or dynamic RAM (DRAM). Memory 104 may be used to store any information, such as state information of system 100. Memory 104 may, for example, may also be used to store instructions of system 100, including instructions of image processing module 112. System 100 may include one or more processors 102 as necessary or appropriate.

Bus 108 may include a communication infrastructure that allows interaction between the various components of system 100. Bus 108 may, for example, carry data between the components of system 100, such as between processor 102 and memory 104. Bus 108 may include a wireless and/or wired communications medium between the components of system 100, and may include parallel, serial or other topological arrangements.

A persistent storage 106 may include components such memory or other persistent storage as is used by system 100 to store data over some extended period of time (e.g., as compared to memory 104). Persistent storage 106 may include non-volatile main memory as used by processor 102 in system 100. Persistent storage 106 may include, for example, flash memory, a hard disk or optical disk.

A database 110 may include any structured or organized manner of storing data. Database 110 may include video, and/or other image data, including a series of frames received from any and/or various sources. For example, database 110 may include videos obtained from the Internet or other source, which have been and/or are to be processed by system 100 (as discussed in greater detail below) and stored as reference video frames for processing by system 100. Database 110 may store any other information pertaining to the video frames as well, including but not limited to movement information. According to another embodiment, database 110 may include an index of pointers to videos available at various network accessible locations. Database 110 may also include, summary information including visual motion and/or other information obtained from pre-processing the videos.

As just referenced, database 110 may include a catalogue, index or other organization of videos and/or selected video frames available to system 100. According to an example embodiment, the available videos may be catalogued or organized by the similarity of various identified objects in the video frames.

An image processing module 112 may, through its components as shown in FIG. 1, process an input image 114 to determine which, if any, of the object(s) of the image are moving. Image processing module 112 may, for example, receive or select an image or frame (e.g., 114), and then determine, based on a comparison with one or more visually similar frames from database 110, the moving object(s) of the input image 114.

Image processing module 112 may include an input image receiver 122. Input image receiver 122 may receive a selection of the image 114. According to an example embodiment, through input image receiver 122, a user may select image 114 to be input into the system 100 for processing. Or, for example, input image receiver 122 may receive image 114 from database 110, memory 104, persistent storage 106 and/or another location, such as the Internet, universal serial bus (USB) drive or other source or networked connection.

Input image 114 may include any image received by or otherwise input into system 100 for processing. Input image 114 may include, for example, a static or still image, such as a photograph, drawing, or rendering of some kind. Input image 114 may include a frame taken from a series of frames from a movie or other time-lapsed sequence of images, an individual photograph, or any other captured or created image, digital or otherwise. According to an example embodiment, input image 114 may include several images, one or more of which are to be selected for processing by system 100.

Input image 114 may include one or more objects that may have been in motion at the time of video capture as referenced above. An example of an input image 114 may be the street-view of a particular location, where the image includes objects such as a road, trees, buildings, vehicles and people, whereby though the road, trees and buildings may have been static at the time of image capture, the people and/or vehicles may have been in motion.

A video frame selector 124 may select one or more video frames from database 110 or other source. Video frame selector 124 may select one or more video frames (e.g. from database 110) that it determines to be visually similar to input image 114. In another example embodiment, video frame selector 124 may select visually similar video frames from another source (e.g., the Internet), which are then input into database 110. For example, if input image 114 includes a car and buildings, then video frame selector 124 may select other videos and/or video frames (including key frames) that include cars and/or buildings. A key frame, as will be discussed in greater detail below, may include any selected frame from a video that is associated with motion information and may be used by system 100 to determine which objects of image 114 are moving.

Video frame selector 124 may perform a nearest neighbor, proximity, or similarity search for video frames resembling input image 114. Video frame selector 124 may, for example, perform a nearest neighbor search, whereby, based on database 110, neighboring video frames may be identified. The neighbors, or neighboring videos, may be identified as being visually similar to input image 114. For example, the k nearest neighbors may be determined using a method such as a k-NN search. In various embodiments, there may or may not be additional analysis by video frame selector 124 to determine visual similarities between the neighboring videos and input image 114.

According to an example embodiment, visual similarities may be determined based upon a preconfigured threshold. For example only those frames that meet or exceed similarity threshold may be considered neighbors.

A k-NN (or KNN) search may include for example, searching through database 110 (or other source of video frames) for K, a variable, frames that are visually similar to input image 114. The variable K may be set or changed on a case-by-case basis as necessary to perform a relevant query. Then for example, video frame selector 124 may use a distance function to determine the level of visual similarity between a video frame and input image 114, including portions thereof. One feature of performing a k-NN search is that is typically performed with respect to a source that includes a large enough selection of video frames to increase the likelihood of the search resulting in relevant video frames. One example source, as previously referenced, is online video from any number of internet web sites.

Video frame selector 124 may include a video frame processor 125. Video frame processor 125 may process video frames for storage in and/or as stored by database 110. Video frame processor 125 may, in an example embodiment, be used to pre-process videos which are then stored in database 100. In another example embodiment, video frame processor 125 may be used to process only those videos as selected by video frame selector 124, either from database 110 or another source. In another example embodiment, video frame processor 125 may pre-process videos for storage in database 110 and then perform additional processing, such as determining key frame and motion information, on those videos of database 110 as selected by video frame selector 124.

As just referenced, video frame processor 125 may collect key frame information from video frames used to populate database 110. According to an example embodiment, an individual video may include or result in one or more key frames being captured and populated into database 110 by video frame processor 125. A key frame may include any frame that may be useful in identifying moving objects in the images (e.g., 114) to be processed by system 100. Such key frame information may include a selected frame from a sequence of video frames, identified objects within the frame, and/or motion information such as horizontal and/or vertical motion information of the objects appearing in the selected frame.

For example, a video may include a sequence of frames that may depict a person walking and jumping down the street. Video frame processor 125 may then select one or more key frames from the video, and with each key frame video frame processor 125 may include key frame information such as whether the person is moving horizontally across the frame, vertically across the frame, or both. In another example embodiment, the motion information may include other vector and/or image information as may be necessary for image processing by system 100. The key frame and motion information may be stored in database 110.

A model motion image generator 126 may generate a model motion image 127. Model motion image 127 may include an image generated from a combination of one or more selected video frames (e.g., as selected by video frame selector 124 as determined to be visually similar to input image 114). Model motion image 127 includes a representation of the motion information of the selected video frames. Model image generator 126 may generate model motion image 127, for example, using a motion determination technique such as, but not limited to, optical flow to estimate the motion of the selected video frames. According to an embodiment, model motion image 127 is an image having the same size as input image and in which the pixels represent the average motion of the selected video frames.

The optical flow of a frame may include a pattern of apparent motion of objects, surfaces and/or edges in a visual scene or image between an observer and the scene, or for example, the relative motion (vertical and/or horizontal motion) between the objects of the image. In general, optical flow refers to the apparent motion of brightness patterns observed when a camera is moving relative to the objects being imaged. For example, optical flow techniques enable the recovery of relative motion of objects and/or the shapes of objects based on intensity changes of pixels over time in a sequence of images. In a sequence of ordered images, the motion may be estimated based on image velocities and/or discrete image displacements. In an example embodiment, optical flow may be used across various selected images (e.g., visually similar to the input image 114) to determine the average motion detected amongst the images. This average motion may then be used to generate the model motion image 127. According to one embodiment model motion image generator 126 may generate model motion image 127, whereby model motion image 127 incorporates the movement information of the selected frames that are determined to be visually similar to input image 114. Model motion image 127 may include a representation of the movement information that corresponds to the selected video frames as aligned with input image 114. For example, if input image 114 is of a cat climbing a tree, then for example model motion image 127 of the cat climbing the tree may include the cat being further up the tree than it appears in input image 114. In another embodiment, model motion image 127 may include a preceding image of the cat, whereby the cat may appear to be further down the tree than in input image 114. Thereby model motion image 127 includes the movement information of the cat moving up the tree, in a representation of input image 114. Then for example, moving object detector 128, as will be discussed in greater detail below, may compare model motion image 127 to input image 114 to determine which object(s), if any, are moving and the extent to which they have or are predicted to move.

Model motion image 127 may be further processed by first warping one or more of the selected video frames (e.g., as selected by video frame selector 124) to align with input image 114 and then applying the same or similar warping function to correspondingly align the motion information of the respective selected video frames to warp-align model motion image 127.

Warping an image may include manipulating, distorting and/or otherwise morphing the selected video frames to more closely align them with input image 114. The warping may include aligning one or more objects of a selected video frame to one or more objects in the selected image 114. For example, warping a video frame may include distorting the video frame or adjusting pixels of the video frame such that a depiction of a a dog that may appear in the video frame is more closely aligned with a depiction of a dog that may appear in image 114.

Model motion image generator 126, for example, may generate model motion image 127 by calculating respective pixels in model motion image 127 based upon a corresponding segment or pixel(s), in each of the selected, warped video frames as determined to be visually similar to each other and/or input image 114. In an example embodiment, the pixel value in model motion image 127 may include an average, or other determined value, of the corresponding pixels in the selected, warped video frames. In other example embodiments, model motion image 127 need not be determined based on individual pixel values, but may be determined based on groupings of pixels or other portions of selected video.

In another embodiment, warping a selected video frame may include first generating a dense correspondence map 129 for the selected video frame and then warping the video frame to correspond or align with input image 114 based on a dense correspondence map 129. The dense correspondence map 129 may include, for example, a mapping of differing densities of correspondence between a selected video frame and input image 114. Then for example, using dense correspondence map 129, the selected video frame may be warped such as to maximize the correspondence between the selected video frame and input image 114, where areas of higher density take priority over areas of lower density on map 129. In other example embodiments, dense correspondence map 129 may be used to generate model motion image 127 based on the correspondence of the (warped) selected frames to each other.

Model motion image 127 may include a single-channel image. For example, where a selected video frame may include a dual-channel image, whereby it is associated with both horizontal and vertical movement information, model motion image 127 may incorporate such movement information within model motion image 127 and thus may be a single-channel image.

A moving object detector 128 may determine which are moving object(s), if any, of image 114. Moving object detector 128 may compare model motion image 127 to input image 114. Then, based on the comparison (e.g., the differences and/or similarities between model motion image 127 and input image 114), moving object detector 128 may determine which object(s) of input image 114 are moving and/or most likely to be moving upon image capture. For example, moving object detector 128 may determine that a person object in image 114 is likely the moving object based on model motion image 127 that indicates corresponding person objects are associated with movement information. In other example embodiments, the movement in image 114 may be narrowed down to portions, segments or even pixels likely to be involved with motion.

Though the objects in a still or static image, such as image 114, when captured may appear to be still in the image, at the time of image capture it is possible that one or more of those objects may be and/or may have been moving. Moving object detector 128 may then determine which object(s) of image 114 are likely to have been moving at the time of image capture. Often times, capturing a moving object may create a blur in the image, indicating a motion of the object. System 100 may reduce or prevent this blur by attributing more resources of the capturing device to the moving object(s) and/or portion(s) of the image.

Moving object detector 128 may use a threshold 133 by which to detect moving objects in input image 114. Threshold 133 may include, for example, a value and/or range of values used to differentiate likely foreground pixels, segments and/or objects in an image from likely background, using any number of pixel and/or other image characteristics. For example, threshold 133 may correspond to the brightness value of a pixel (or other portion or segment of an image), whereby it is determined that pixels greater than a certain brightness threshold are likely to be foreground, and pixels less than the brightness threshold are likely be background, or vice versa. Then for example, the foreground pixels of model motion image 127 may be compared to the foreground pixels of input image 114 by moving object detector 128.

System 100 may differentiate foreground pixels and objects from background pixels and objects, and detect motion in input image 114 without any additional user input. Though system 100, in other embodiments, may allow a user to specify particular segments and/or objects of input image 114 which to process or detect for motion, such input is not required by system 100 to detect motion in input image 114.

An image segmenter 130 and segment pixel processing module 132 may include processing logic to further refine the moving object detection of the other modules, as just described, of image processing module 112. It should be understood that the system 100 may detection motion in input image 114 without utilization of image segmenter 130 and/or segment pixel processing module 132.

Image segmenter 130 may segment an image (e.g., model motion image 127, input image 114 and/or selected video frames) into a plurality of image segments. Image segmenter 130 enables for greater precision in determining which portions, objects and/or segments of image 114 are in, or are likely to have been in motion at the time of image capture. Image segmenter 130 may segment image 114 based upon image content of image 114. For example, image 114 may be segmented based upon any image characteristic, such as layout or locations of objects in the image, color, detected object/shape, texture, etc. The segments of any segmented image(s) may vary by size, shape and/or selection criteria. An individual image may be segmented multiple times in several different ways to achieve greater precision and/or a variety of possible moving object detection scenarios and/or refinement scenarios. In an example embodiment, image segmenter 130 may also segment model motion image 127 based upon similar segmentation characteristics as compared to input image 114.

A segment pixel processing module 132 may compare the segments of segmented model motion image 127 to the segments of segmented input image 114 to determine similarities and/or differences between the segments. Segment pixel processing module 132 may adjust or warp the pixels of a segment of the model motion image to correspond more closely with one or more corresponding segments of input image 114 and/or to create a mean representation of a segment within model motion image 127 that corresponds to the selected video frames from which model motion image 127 was produced or generated. Moving object detector 128 may then compare the segments of model motion image 127 to segments of the input image 114 to determine more particularly, which pixel(s), segment(s) and/or object(s), if any, of image 114 are moving. Segment pixel processing module 132 may use threshold 133 to differentiate between various background and foreground pixels in an image (e.g., input image 114, model motion image 127) it is processing.

One method of adjusting the pixels of a segment of the model motion image may include using a statistically-determined pixel value based upon pixels of the respective segment, or a portion thereof. The statistically-determined pixel value may include an average or mean of the pixels in the portion. For example, the pixels of a particular segment of model motion image 127 may be compared across one or more of the selected visually similar frames used to compose model motion image 127, whereby the pixels of the model motion image 127 are adjusted to represent, more closely, the corresponding segment(s) of the selected visual frames. Then for example, the pixel(s) of the segment of model motion image 127 may, as needed, be adjusted based on the determined pixel value.

According to another example, if model motion image 127 was generated from five frames selected from database 110 that were determined to be visually similar to input image 114, then segment pixel processing module 132 may count the corresponding pixels used to generate model motion image 127, and then average or use a weighted average (depending upon a relative importance of the selected frames) to determine the adjustment value in each segment. The relative importance or weighted value of a selected frame may correspond to a level of determined visual similarity between respective segments of the selected frame and the segments of input image 114.

According to yet another example, image segmenter 130, may process an image (e.g., input image 114 and/or model motion image 127), such that the image is segmented into pixels. Pixel segment pixel processing module 132 may refine input image 114 as segmented by image segmenter 130 and/or may refine image 114 (without prior segmentation by image segmenter 130) into pixels. Then for example, based on the pixelated segments of input image 114 as determined by segment pixel processing module 132, moving object detector 128 may detect motion amongst the pixels of input image 132 by comparing them with the most closely corresponding pixels of model motion image 127.

Figure 2:
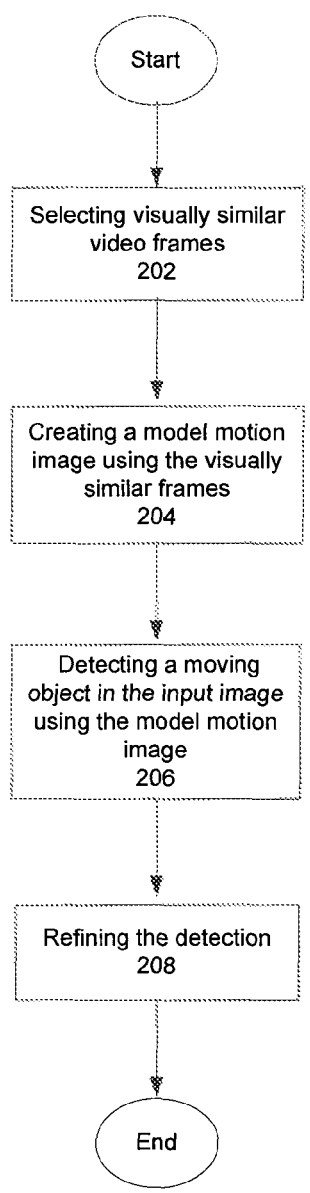
FIG. 2 illustrates a method for detecting moving objects in static images.

FIG. 2 illustrates a process 200 for detecting moving objects in static images. At step 202, given an input image, visually similar video frames may be selected. In FIG. 1, video frame selector 124 may select one or more video frames from database 110, whereby the selected frames are determined to be visually similar to image 114. For example, video frame selector 124 may perform a nearest neighbor search (e.g. kNN search) on input image 114 against the frames from database 110 to select one or more frames that are visually similar to input image 114.

At step 204, a model motion image of the input image may be generated using the selected visually similar frames. Model motion image generator 126 may generate model motion image 127 based on the visually similar frames selected by video frame selector 124. For each visually similar frame, its motion information can be determined, and based upon the determined motion information of any number of visually similar frames, model motion image 127 can be determined by model motion image generator 126. The motion information for the selected frames can be determined using a conventional motion estimation technique such as optical flow. The determined motion information for the respective selected images can then be combined statistically (e.g. averaged) to determine model motion image 127 that corresponds to input image 114.

Optionally, for each visually similar frame, model motion image generator 126 may warp the frame as needed to more closely align with input image 114. Then model motion image generator 126 may apply the same or similar warping function to the previously determined motion information of the frame. The warped motion information of the selected frames can then be combined to generate a model motion image 127 in which objects and corresponding motion information have been warped to better correspond to input image 114. The process for generating a model motion image is discussed in greater detail below with reference to FIG. 4.

At step 206, a moving object may be detected in an input image using the model motion image. Moving object detector 128 may detect a moving object in input image 114 by using model motion image 127, as discussed above. For example, based on similarities and/or differences between model motion image 127 and input image 114, in reference to movement information from the selected visual frames as relating to model motion image 127, moving object detector 128 may detect one or more moving objects in input image 114. Moving object detector 128 may determine there to be no moving objects in image 114. Model motion image 127 may include a representation of input image 114 with an incorporation of the movement information. For example, if input image 114 is of a car on a road, then model motion image 127 may include a representation of the motion information of the car (as assembled from the visually similar frames) with the predicted motion of the car (e.g., the car may be further down the road in model motion image 127 than in input image 114, because the car is determined, by system 100, to be the moving object).

Optionally, in step 208, the detection may be refined. For example, input image 114 may be segmented and compared at a more detailed or segmented level to a segmented model motion image 127. Then, for example, moving object detector 128, based upon a comparison of segments and/or portions thereof between model motion image 127 and input image 114, may determine more precisely, or at a more refined level, which portion(s), object(s), pixel(s) and/or segments of selected image 114 are moving. The refinement process is discussed in greater detail below with reference to FIG. 3.

Figure 3:
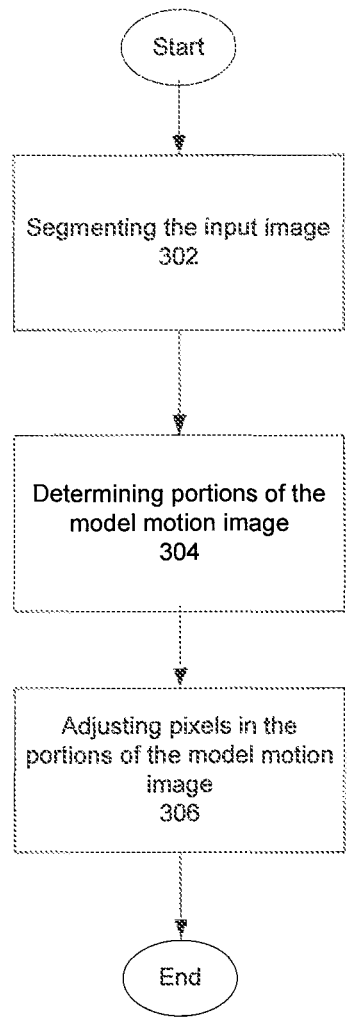
FIG. 3 illustrates a method for refining the detection of moving objects.

FIG. 3 illustrates a method for the refining step 208 of FIG. 2. In step 302, the input image may be segmented. In the example of FIG. 1, image segmenter 130 may segment input image 114, which may be segmented or otherwise divided into one or more segments or portions based on any number of visual characteristics of the image 114. For example, image segmenter 130 may segment image 114 based on a location of the segments, e.g., the segments could integrate with one another as puzzle pieces. Or, for example, segment pixel processing module 132 may segment image 114 a pixel basis, where like pixels are grouped into segments In step 304 portions of the model motion image may be determined. Image segmenter 130 may determine portions of model motion image 127. Image segmenter 130 may, for example, segment model motion image 127, to determine portions, based on the characteristics used to segment input image 114. The portions of model motion image 127 may correspond to portions of input image 114, whereby when compared on a portion-by-portion basis, differences and similarities between model motion image 127 and input image 114 will be more readily apparent.

In step 306, the portions of the model motion image may be adjusted. Segment pixel processing module 132 may compare the segments of segmented model motion image 127 and the segments of segmented input image 114 to determine similarities and/or differences between the segments. Segment pixel processing module 132 may adjust or warp the pixels of a segment of model motion image 127 to correspond more closely with one or more corresponding segments of input image 114.

Figure 4:
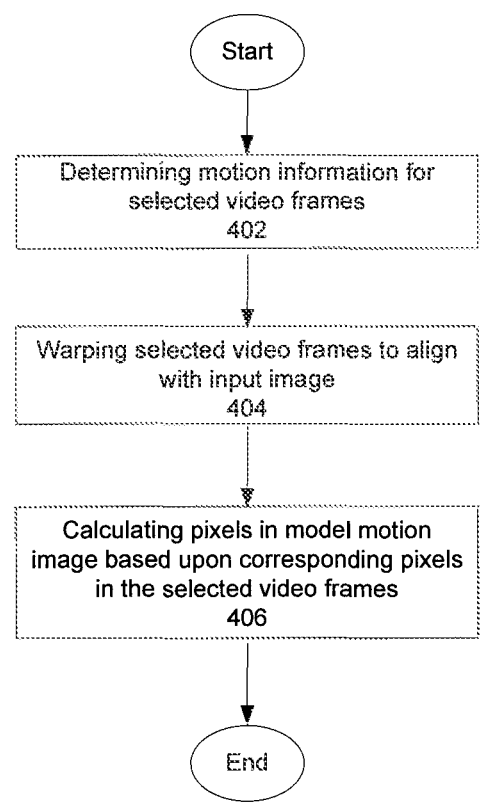
FIG. 4 illustrates a method for generating the model motion image.

FIG. 4 illustrates a method for generating the model motion image of FIG. 2. In step 402, motion information for selected video frames may be determined. In the example of FIG. 1, model motion image generator 126 may analyze or otherwise gather the motion information of the video frames selected to be visually similar to input image 114 and used to assemble or generate model motion image 127. The motion information may include information that indicates which object(s) of the selected video frame(s) are in motion and in which direction the motion is carrying the object(s). As described above, a conventional motion estimation technique such as, but not limited to, optical flow can be used to determine the motion information of the respective selected frames.

Optionally, in step 404, the selected video frames may be warped to align with an input image. Model motion image generator 126 may warp the selected visual frames to align more closely with input image 114. For example, a selected visual frame may be warped such that a car object that may be displayed in a selected visual frame aligns with a car object that appears in input image 114. The alignment, for example, may reduce the difference in the location of the car object in input image 114 and the corresponding car object in the selected visual frame. Or for example, the size of a car object that appears in the selected visual frame may be warped to more closely correspond to the size of a car object that appears in input image 114. In some video frames warping may not be necessary. The same or similar warping function used to align a selected frame to input image 114, can then be used to warp the motion information of that selected frame in order to better align the motion information with input image 114.

In step 406, pixels in the model motion image may be calculated based upon corresponding pixels in the selected video frames and/or the corresponding motion information. Model motion image generator 126 may generate model motion image 127, including its pixels, based upon the motion information of the respective selected visually similar frames. The determined motion information of the selected respective frames can be combined to form model motion image 127. The motion information can be combined using a statistical method such as, but not limited to, averaging of corresponding pixels in the respective motion information. According to another embodiment, where the selected frames and corresponding motion information have been warped to better align with input image 114, the warped motion information can be combined to form a model motion image 127 that is better aligned to input image 127.

FIG. 5 illustrates, in the form of line drawings, an example of segmentation of an input image. 502A, 502B and 502C show example segmentations of a single image. 502A-502C show examples of segmentation based on location of the objects or segments within the image. In other embodiments, 502A-C could be further or alternatively segmented by other properties, including but not limited to color, texture and brightness. 502A, for example, shows an original input image which is not segmented. 502B shows the input image shown in 502A broken down into segments or portions. 502C shows a further, more detailed and/or more refined segmentation of the image shown in 502B.

504A-504C show example motion information corresponding to the segmentations of the input image shown in 502A-502C, respectively. The motion information is represented as images of the same size as the input image. The respective images shown in 502A-C are processed, whereby based upon various visual characteristics of the image, a threshold may be determined that differentiates background from foreground. In 504A, the pixels of the image may be separated into foreground pixels (e.g., pixels that are likely to be part of the foreground of the image) and background pixels (e.g., pixels that are likely to be part of the background of the image) at a very fine or detailed level. Then for example, as shown in 504B, the image shown in 504A may have been refined or segmented further such that visually similar pixels are grouped into segments, for example, based on their location in the image. 504B may have been further refined as shown by 504C to more closely resemble the foreground of the original pixilated image. 504A-C show a refinement process in the differentiation process, whereby each further level of refinement produces a segmentation which is more representative of the original image.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for detecting a moving object, comprising:
   selecting a plurality of video frames that are visually similar to an input image;
   generating a model motion image by estimating motion for the selected video frames, wherein generating the model motion image includes determining motion information corresponding to respective ones of the selected video frames;
   segmenting the input image into input image segments;
   adjusting pixels in portions of the model motion image by replacing pixel values in each of a respective one of the portions with a statistically-determined pixel value, wherein the respective one of the portions corresponds to one of the input image segments; and
   detecting, using the model motion image, a moving object in the input image based on differences between the model motion image and the input image and based on the adjusted portions of the model motion image.

2. The method of claim 1, wherein segmenting the input image is based upon a location of objects in the input image.

3. The method of claim 1, further comprising: warping respective ones of the selected video frames to align each of the respective ones of the selected video frames with the input image, and wherein the respective pixels in the model motion image are based upon an average of corresponding pixels in each of the warped selected video frames.

4. The method of claim 3, wherein warping respective ones of the selected video frames include: aligning one or more objects in each respective selected video frame to one or more objects in the input image.

5. The method of claim 3, wherein warping respective ones of the selected video frames includes: generating a dense correspondence map for each respective selected video frame; and warping the video frame using the dense correspondence map.

6. The method of claim 1, wherein the motion is estimated using an optical flow.

7. The method of claim 1, wherein the motion information includes horizontal motion information and vertical motion information.

8. The method of claim 1, wherein selecting the plurality of video frames comprises:
   performing a nearest neighbor search of a collection of video frames to determine the plurality of video frames.

9. The method of claim 1, wherein the input image is at least one of a photograph or an image of a video frame.

10. The method of claim 1, wherein the plurality of selected video frames include key frames.

11. The method of claim 1, further comprising: determining a threshold of the input image, wherein the threshold differentiates a foreground object of the input image from a background object of the input image, and wherein the detecting includes comparing, based upon the threshold, a foreground object of the model motion image to the foreground object of the input image.

12. A system for detecting a moving object, comprising:
   a processor;
   a memory communicatively coupled to the at least one processor;
   a video frame selector configured to execute on the processor, and to select a plurality of video frames that are visually similar to an input image;
   a model motion image generator configured to execute on the processor, to generate a model motion image by estimating motion for each selected video frame, to segment the input image into input image segments, and to adjust pixels in portions of the model motion image by replacing pixel values in each of a respective one of the portions with a statistically-determined pixel value, wherein the respective one of the portions corresponds to one of the input image segments; and
   a moving object detector configured to execute on the processor, and to detect a moving object in the input image based on differences between the model motion image and the input image and based on the adjusted portions of the model motion image.

13. The system of claim 12, wherein the motion is estimated using an optical flow.

14. An article of manufacture comprising a non-transitory computer readable medium encoding instructions thereon that in response to execution by a computing device cause the computing device to perform operations comprising:
   selecting a plurality of video frames that are visually similar to the input image;
   generating a model motion image by estimating motion for each selected video frame;
   segmenting the input image into input image segments;
   adjusting pixels in portions of the model motion image by replacing pixel values in each of a respective one of the portions with a statistically-determined pixel value, wherein the respective one of the portions corresponds to one of the input image segments; and
   detecting a moving object in the input image based on differences between the model motion image and the input image and based on the adjusted portions of the model motion image.

15. The article of manufacture of claim 14, wherein the motion is estimated using an optical flow.

16. The article of manufacture of claim 15, wherein the motion information includes horizontal motion information and vertical motion information.

17. The article of manufacture of claim 15, wherein selecting the plurality of video frames comprises: performing a nearest neighbor search of a collection of video frame to determine the plurality video frames.

18. The article of manufacture of claim 15, wherein the input image is at least one of a photograph or an image of a video frame.

19. The method of claim 1, wherein the statistically-determined pixel value is an average or a mean of the pixel values in the respective one of the portions.

20. The system of claim 12, wherein the motion information includes horizontal motion information and vertical motion information.

* * * * *